United States Patent [19]

Waldmann

[11] 4,339,883
[45] Jul. 20, 1982

[54] PROCESS AND APPARATUS FOR THE SEPARATION OF HARMFUL SUBSTANCES FROM WASTE GASES, PARTICULARLY IN THE DRYING OF WOOD CHIPS

[76] Inventor: Günter Waldmann, Packenreiterstr. 18b, D-8000 München, Fed. Rep. of Germany

[21] Appl. No.: 162,109

[22] Filed: Jun. 23, 1980

[30] Foreign Application Priority Data

Jul. 2, 1979 [DE] Fed. Rep. of Germany ....... 2926663

[51] Int. Cl.³ .............................................. F26B 3/04
[52] U.S. Cl. .......................................... 34/27; 34/32; 34/76; 34/77; 34/79; 165/95

[58] Field of Search ...................... 165/95; 432/67, 72; 122/390, 391, 392; 34/77, 74, 76, 35, 86, 79, 27, 32

[56] References Cited

U.S. PATENT DOCUMENTS 3,875,678  4/1975  Vito .......................................... 34/79
4,099,338  7/1978  Mullin et al. ............................ 34/86

Primary Examiner—Larry I. Schwartz
Attorney, Agent, or Firm—Michael J. Striker

[57] ABSTRACT

The invention relates to a process and apparatus for drying materials such as wood chips and removing condensable and/or precipitable substances from the resulting waste gas.

27 Claims, 1 Drawing Figure

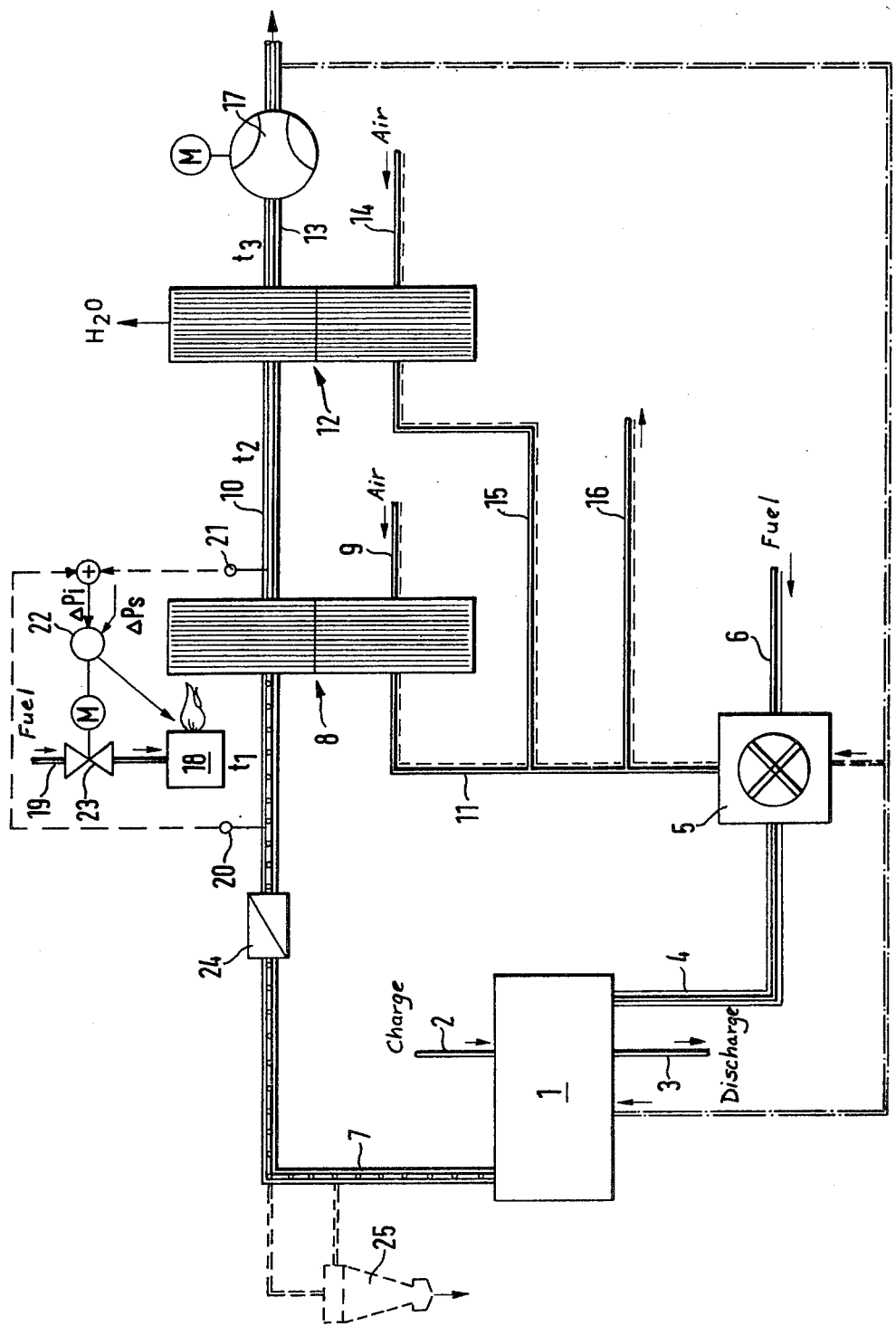

PROCESS AND APPARATUS FOR THE SEPARATION OF HARMFUL SUBSTANCES FROM WASTE GASES, PARTICULARLY IN THE DRYING OF WOOD CHIPS

In the processing of wood chips, for instance for chipboard and similar, it becomes necessary to subject the raw chips to drying. In drying, the waste gas will entrain harmful substances, particularly wood dust and also natural and synthetic resins and terpenes, as well as water vapor (compare, hereto, for instance "Holz als Roh- und Werkstoff", 36 (1978), pp. 407–411). Considerable environmental pollution resulted thereby, particularly with larger drying plants. Attempts to remove the harmful substances from waste gas by means of wet scrubbers were successful only in part. Although it is possible to considerably reduce the dust content by means of wet scrubbers, the resins and particularly the terpenes will remain in the waste gas, since due to their hydrophobic characteristics, they can hardly be separated.

A further and considerable disadvantage of existing drying plants lies in the fact that drying requires very large quantities of heat and thus large quantities of fossil fuel such as petroleum.

SUMMARY OF THE INVENTION

It is the object of the invention to make available a process and apparatus by which the aforesaid harmful substances may be separated from waste gas.

The present invention provides a method for drying materials comprising providing a stream of hot gas, passing the hot gas over the material to be dried, removing the now waste gas from the material to be dried, cooling the waste gas until the volatile substances will condense and/or precipitate concomitantly bonding dust and/or similar materials. The materials to be dried can be wood chips. Also the precipitated and/or condensed material can be burned off, possibly intermittently. The waste gas flow can be interrupted for the purpose of burning off precipitated and/or condensed materials. The waste gas flow can be divided into several partial flows, which can be cyclically interrupted for the purpose of burning off precipitated and/or condensed materials. The burning off can be initiated by sensing the exceeding of a threshold value of the pressure differential of the waste gas between a point before the cooling and a point after the cooling.

The waste gas can be additionally cooled after having been freed from condensable and/or precipitable materials to below the dew point of water. The cooling and/or additional cooling can be performed by exchanging heat. Preferably a fresh air flow is warmed by heat exchange with the waste gas and the warmed fresh air flow can be a source for the stream of hot gas. Also some of the cooled waste gas can be fed back to the stream of hot gas.

There is also provided an apparatus for the separation of fed-in combustible and/or condensable and/or precipitable substances from the waste gas of drying installations. The apparatus comprises a drying chamber, a supply line connected to the drying chamber for providing stock to be dried, an offtake line connected to the drying chamber for removing the dried stock, an input to said drying chamber for feeding in hot gas, an output to said drying chamber for removing waste gas and a first heat exchanger connected to the waste gas output of the drying chamber and having a waste gas output and having an input and an output for exchange fluid providing for cooling of the waste gas from the drying chamber to a temperature ($t_2$) for precipitating and/or condensing materials carried.

The apparatus can further comprise a burner for generating hot drying gas, which burner is connected to the input of the drying chamber. The heat exchange fluid can be fed to the burner or to the drying chamber after having been warmed up. A second heat exchanger can be provided and be connected to the waste gas output of the first heat exchanger for cooling the waste gas exiting from the first heat exchanger. The exchange fluid from the second heat exchanger can be fed to the burner or to the drying chamber after having been warmed up. The second heat exchanger can be capable of cooling to below the dew point of water. The first and/or second heat exchanger can further employ heat tubes.

In addition a burning off device can be provided appurtenant to the first heat exchanger for cleaning the same by burning off precipitated or, respectively, bonded combustible materials. The heat exchanger can comprise portions to alternately be fed with waste gas and be burning off deposits. The burning off device can be co-ordinate placeable and move in cycles relative to the heat exchanger surface of the first heat exchanger. Alternatively, a burner bar can be provided movable in cycles and relative to the heat exchange surface of the first heat exchanger. The burning off device can also be stationary with individual burners being capable of cyclic operation. Also, the burning off device can be capable of intermittent operation triggered upon interruption of the waste gas flow from the drying chamber. A sensor can be provided depending on the pressure differential ($\Delta p_i$) between the waste gas carrying materials at a position in front of the first heat exchanger and at a position behind the first heat exchanger and upon a threshold ($\Delta p_s$) being exceeded then setting in operation at least a portion of the burning off device appurtenant to the first heat exchanger. Also a sensor can be provided depending on the pressure of the waste gas after the first heat exchanger and upon touchinng a threshold value then initiating the burning off device of the first heat exchanger. Also a timing element may be provided which will initiate cutting off the first heat exchanger or, respectively, an appropriate portion thereof, at predetermined points in time and/or after a predetermined interval.

It has been demonstrated that the invention will allow the practically complete removal from waste gas not only of the dust, but also of resins and terpenes, the invention allowing herein recuperation of heat to an extent that will, furthermore reduce the fuel requirements to an outstandingly high degree. Also, the danger of explosions may be strongly reduced by using a part of the scrubbed waste gas as inert gas.

The invention may, herein, not only be applied to wood chip drying but also in such instances where comparable waste gases containing harmful substances develop, as, for instance, in plywood drying, lacquer processing or similar.

The invention shall be explained in closer detail using the embodiment shown in the drawing. The only figure of the drawing shows a flow sheet of a drying plant laid out as per invention.

DESCRIPTION OF THE INVENTION AND PREFERRED EMBODIMENTS

In accordance with the present invention a process is provided for the separation of fed-in combustible and-/or condensable or, respectively, precipitatable harmful substances from the waste gas of drying installations, particularly in wood chip drying, characterized by cooling the waste gas until the volatile harmful substances will forcibly condense and precipitate in the waste gas, concomitantly bonding dust or similar materials.

According to one aspect of the invention an apparatus is provided for the separation of fed-in combustible and/or condensable and/or precipitable harmful substances from the waste gas of drying installatiions, particularly in the drying of wood chips, and particularly for the implementation of the separation process mentioned above, with a drying chamber supplied with hot gas from a combustion chamber, said drying chamber allowing throughput of the stock to be dried and also allowing removal of waste gas carrying harmful substances, characterized by a first heat exchanger cooling the waste gas from the drying chamber to a temperature ($t_2$) at which the harmful materials will be forcibly precipitated or, respectively, condensed out under concomitant bonding of dust.

The stock to be dried is fed through a supply line 2 to the drying chamber, the drying stock consisting here of wood chips, The dried stock is removed from the drying chamber 1 by an offtake line 3. The drying chamber 1 is supplied over a line 4 with a hot gas that has been heated in a burner 5 supplied by a line 6 with a fuel such as petroleum or the like, up to a temperature suitable for drying the stock. The waste gas resulting in drying is removed from the drying chamber 1 over a waste gas line 7. The waste gas is of a comparatively high temperature $t_1$ and will entrain the harmful substances accruing in drying. In the present embodiment the harmful substances will in essence consist of larger quantities of wood dust, and of resins and terpenes. In general, natural resins will be concerned herein, but synthetic resins may be contained to a small extent since waste products such as cuttings from chipboards and similar are supplied for reprocessing and thus also being dried.

Although it is possible to separate the dust from waste gas by means of wet scrubbers or the like, resins and terpenes may, however, not be removed in this manner and will reach the environment through the chimney so that environmental pollution will be very great, a least with larger drying plants, particularly since some resins and terpenes must be considered as toxic substances or as harmful to health.

The waste gas at temperature $t_1$ in the waste gas line 7 is fed to a first indirect heat exchanger 8 wherein the waste gas will exchange heat with a comparatively cold fluid, particularly fresh air which has been fed to the heat exchanger 8 by a line 9. The waste gas is cooled in the first heat exchanger 8 down to a temperature $t_2$ which is distinctly below the condensing point of resins and terpenes. The resins and terpenes will thus condense within it when passing the first heat exchanger 8, with the dust being bonded to the condensing terpenes and resins. The waste gas at temperature $t_2$ leaving the first heat exchanger 8 by the line 10 will thus be practically free from harmful substances. The heat given off upon heat exchange within the first heat exchanger 8 will, furthermore be reused since the heated fresh air is being fed to the burner by a line 11. Energy for generating hot air, and thus the quantity of the fuel to be supplied by line 6, will therefore be reduced.

It is furthermore of advantage when water, too, is being removed from the waste gas. A second heat exchanger 12 is provided for this purpose, wherein again an indirect heat exchange is effected, preferably also with fresh air, in such a manner that the waste gas leaving the second heat exchanger 12 by a line 13 will be cooled down to a temperature distinctly below the dew point, of, respectively, saturation point of water, so that the separated water is removed from the second heat exchanger 12 in this process. It is not only the heat obtained by the temperature differential, but also the heat of condensation that may be recuperated in this manner. The fresh air is supplied to the second heat exchanger 12 by a line 14 and taken off by a line 15, with the line 15 ending in the embodiment shown into the line 11. The recuperated heat may also be utilized in a different manner. By supplying the preheated fresh air through a line 16, it may, for instance, be used in other equipment for predrying wood or chips. Instead of fresh air, the two heat exchangers 8, 12 may also be supplied with a different fluid that may be utilized in a different manner. It would, for instance, be possible to heat water for heating purposes or for public baths and the like.

The scrubbed and water-free waste gas in line 13 from the second heat exchanger may be utilized further, it may, however also be vented to the environment through a chimney or similar. A blower 17 is provided to supply motion to the flue gas.

It then proved that, particularly in the embodiment shown, i.e. drying of wood chips, that part of the first heat exchanger 8 which is exposed to the waste gas, will quickly become restricted since the waste gas in line 7 contains a considerable quantity of dust and this dust will bond itself to the forcibly condensed resins and terpenes in the first heat exchanger 8. The first heat exchanger 8 must therefore be cleaned at relatively frequent intervals.

It will be of particular advantage if this part of the first heat exchanger 8 is combined with a burning-off device 18 by which the bonded and combustible dust is being burned and the condensed resins and terpenes are removed from the heat exchanger surfaces. Burning-off will ensue by, for instance, igniting a fuel such as heating oil supplied by a line 19. The energy required for combusting the fuel and thus for burning-off of the dust and removal of resins and terpenes is, to a not inconsiderable degree recuperated by continuing to supply fresh air to the first heat exchanger 8 which fresh air is being heated also during burning-off.

In order to attain burning-off every time when becoming necessary due to a restriction in the flow area of heat exchanger 8, measuring of the pressure differential will preferably be made. A first pressure sensor 20 is provided therefor in the line 7, and a second pressure sensor 21 in the line 10, with their output signals being subtracted from each other in a totalizing member. Depending upon whether the value corresponding to the pressure differential thus determined will exceed a threshold value, supply of fuel to the burning-off device 18 is enabled by a valve 23, whereby furthermore, ignition of the burner flame is also being effected.

The burning-off operation may be effected in different ways:

(a) When burning-off becomes necessary, the waste gas flow will be interrupted by means of a valve in the waste gas line 7 (not shown), and the heat exchanger surface of the first heat exchanger 8 burned off. The burning-off device is shut down after burning off and the aforesaid valve opened again.

(b) At least that part of the first heat exchanger 8 supplied with waste gas, will consist of a plurality of heat-exchange units, each of which, may, respectively, be fed with a partial stream of waste gas and which may, individually, be operated and, individually, be burned-off. Operation of the individual heat exchange units will ensue as under (a), with the number of heat exchanger units depending upon the time required, respectively, for the burning off, or becoming restricted, of a heat exchanger unit. A practically continual operation of the drying installation will be possible since a number of heat exchanger units required and readied for waste gas scrubbing will always be available.

Depending upon the type of the heat exchanger used and the method in which burning-off is effected, the burning-off device 18 may be constructed as coordinate burner, burner bar or also as burner system in stationary installation. It is of essence only that there is no impingement of waste gas carrying harmful substances upon that portion of the first heat exchanger 8 which is being burned off at that moment.

Using of heat exchangers constructed with heat tubes (for instance those from the firm Q-Dot, Dallas, USA) has proved of particular advantage (compare hereto German patent application No. P 29 20 577.4). A high degree of efficiency at comparatively low installed dimensions may be achieved with a heat exchanger of this type, wherein a heat exchanger may be subjected to high loads, i.e. be suitable for burning off by means of the burning-off device 18.

A not inconsiderable danger of explosions is present in the example of wood chip drying described herein. This danger of explosions may, initially, be reduced by constructing the burning-off device explosion protected or, respectively, explosion proof, wherein a flap valve 24 or similar is provided before the burning-off device as shown. A further reduction of the danger of explosions may be achieved when operation of the drying plant may be effected practically continual, intermittent burning-off notwithstanding, (compare alternative b). A portion of waste gas at temperature $t_3$ in line 13, dewatered and free from harmful substances, may, as shown in the dot-dash lines, be supplied as inert gas with a very low oxygen content either to burner 5 or drying chamber 1.

Finally, as shown in broken lines, and particularly when the dust content is very high, the waste gas may, before the lowering of temperature, i.e. before the condensing of resins and terpenes, be fed to a cyclone separator 25 by which a not inconsiderable portion of dust may be separated from the waste gas of drying chamber 1. The cycle time for burning off of the first heat exchanger 8 may thus be extended.

It should be mentioned that when using fresh air as heat-exchange medium, the exit temperatures $t_2$ and $t_3$ at heat exchangers 8 or 12 respectively, will depend uon the respective ambient temperature, so that the heat exchangers 8, 12 must be designed for the most unfavorable condition (high ambient temperature at low temperature $t_1$ of waste gas).

For the following estimate of economies realized by the invention, one should proceed from a drying chamber 1 with a waste gas volume of about 65,000 Nm$^3$/h at average $t_1 = 130°$ C. and a vapor content of 77 g/kg dry waste gas. The temperature value $t_1$ of the waste gas will in general lie between 120° and 140° C. For separation of resins and terpenes, the waste gas will be cooled down in the first heat exchanger to a temperature $t_2$ between 73° and 85° C., average to 80° C. For separation of water, the waste gas free from harmful substances will be cooled down in a second heat exchanger 12 to below 48° C. (dew point of water under these conditions), i.e. to an average of about 40° C. Taking the average temperature of the supplied fresh air as 8° C. when seen as average annual mean value, each heat exchanger will respectively be supplied by about 32,500 Nm$^3$/h fresh air which, in turn, will exit from the first and second heat exchanger at a temperature of about 120° C. or, respectively, 70° C.

In a conventional drying plant without heat exchanger and heat recuparation, operation required a fuel quantity of about 850 kg/h heating oil. An economy of about 310 to 320 kg/h heating oil may be achieved by the invention versus the aforegoing, i.e. an economy of more than one third. Economy attainable with about 6,000 operating hours per annum proves that a drying plant designed as per invention will amortize itself within a relatively short time.

It may be noted in this context that energy recuperation from the waste gas stream had hitherto failed due to the high dust content (minimum 300 mg/Nm$^3$) and also due to the high content of gaseous resins or terpenes respectively.

It must finally also be pointed out that existing drying plants may be equipped with apparatus as per invention without encountering larger problems, particularly in instances when the heat-tube heat exchangers as mentioned before are used, which are of relatively small installed dimensions.

What is claimed is:

1. A process for drying wood chips and/or lacquer comprising providing a stream of hot gas; passing the hot gas over the wood chips and/or lacquer to be dried; removing the now waste gas from the wood chips and/or lacquer to be dried; cooling the waste gas by exchanging heat until the volatile substances carried will condense and/or precipitate concomitantly binding dust and/or similar materials; and intermittently burning off the precipitated and/or condensed material.

2. The process according to claim 1 further comprising
   moving the precipitated and/or condensed material to a burner burning-off device; and burning off the precipitated and/or condensed material.

3. The process according to claim 1 further comprising:
   warming a fresh air flow by heat exchange with the waste gas.

4. The process according to claim 3 further comprising:
   employing the warmed fresh air flow as a source for the stream of hot gas.

5. The process according to claim 1 further comprising:
   additionally cooling the waste gas freed from condensable and/or precipitable materials to below the dew point of water.

6. The process according to claim 5 wherein the additional cooling is performed by exchanging heat.

7. The process according to claim 1 further comprising:
feeding back some of the cooled waste gas to the stream of hot gas.

8. An apparatus for the separation of fed-in combustible and/or condensable and/or precipitable substances from the waste gas of drying installations comprising:
a drying chamber;
a supply line connected to the drying chamber for providing stock to be dried;
an offtake line connected to the drying chamber for removing dried stock;
an input to said drying chamber for feeding in hot air;
an output to said drying chamber for removing waste gas;
a first heat exchange connected to the waste gas output of the drying chamber and having a waste gas output and having an input and an output for exchange fluid providing for cooling of the waste gas from the drying chamber to a temperature ($t_2$) for precipitating and/or condensing materials; and a burning off device appurtenant to the first heat exchanger for cleaning the same by burning off precipitated of, respectively, bonded combustible materials.

9. The apparatus according to claim 8 wherein the exchange fluid from the first heat exchanger is fed to the drying chamber.

10. The apparatus according to claim 8 wherein the first heat exchanger comprises portions; one portion to be fed with waste gas and another portion to be employed in burning off deposits.

11. The apparatus according to claim 8 further comprising a burner for generating hot drying gas connected to the input of the drying chamber.

12. The apparatus according to claim 11 wherein the exchange fluid of the heat exchanger is fed to the burner.

13. The apparatus according to claim 11 further comprising:
a second heat exchanger connected to the waste gas output of the first heat exchanger for cooling the waste gas exiting from the first heat exchanger.

14. The apparatus according to claim 13 wherein the exchange fluid of the second heat exchanger is fed to the drying chamber.

15. The apparatus according to claim 13 wherein the exchange fluid of the second heat exchanger is fed to the burner.

16. The apparatus according to claim 13 wherein the second heat exchanger is capable of cooling the waste gas to below the dew point of water.

17. The apparatus according to claim 13 wherein the first and/or second heat exchangers employ heat tubes.

18. The apparatus according to claim 8 wherein the burning off device is a co-ordinate displaceable device capable of moving relative to the heat exchange surface of the first heat exchanger in cycles.

19. The apparatus according to claim 8 further comprising:
a burner bar movable in cycles and relative to the heat exchange surface of the first heat exchanger.

20. The apparatus according to claim 8 wherein the burning off device is stationary with individual burners being capable of cyclic operation.

21. The apparatus according to claim 8 wherein the burning off device is capable of intermittent operation triggerred upon interruption of the waste gas flow from the drying chamber.

22. The apparatus according to claim 8 further comprising a sensor depending on the pressure differential ($\Delta p_i$) between the waste gas carrying materials at a position in front of the first heat exchanger and at a position behind the first heat exchanger upon a threshold ($\Delta p_s$) being exceeded then setting in operation at least a portion of the burning off device of the first heat exchanger.

23. The apparatus according to claim 8 further comprising a sensor depending upon the pressure of the waste gas after the first heat exchanger and upon touching by the pressure of a threshold value then initiating the burning off device of the first heat exchanger.

24. The apparatus according to claim 8 further comprising a timing element which will initiate cutting off the first heat exchanger or, respectively, an appropriate portion thereof, at predetermined points in time or after a predetermined time interval.

25. A process for drying wood chips and/or lacquer comprising providing a stream of hot gas; passing the hot gas over the wood chips and/or lacquer to be dried; removing the now waste gas from the wood chips and/or lacquer to be dried; cooling the waste gas by exchanging heat until the volatile substances carried will condense and/or precipitate concomitantly bonding dust and/or similar materials; and interrupting the waste gas flow for the purpose of burning off precipitated and/or condensed materials.

26. A process for drying wood chips and/or lacquer comprising providing a stream of hot gas; passing the hot gas over the wood chips and/or lacquer to be dried; removing the now waste gas from the wood chips and/or lacquer to be dried; cooling the waste gas by exchanging heat until the volatile substances carried will condense and/or precipitate concomitantly bonding dust and/or similar materials; and dividing the waste gas flow into several partial flows, which are cyclically interrupted for the purpose of burning off precipitated and/or condensed materials.

27. A process for drying wood chips and/or lacquer comprising providing a stream of hot gas; passing the hot gas over the wood chips and/or lacquer to be dried; removing the now waste gas from the wood chips and/or lacquer to be dried; cooling the waste gas by exchanging heat until the volatile substances carried will condense and/or precipitate concomitantly bonding dust and/or similar materials; and initiating burning off the precipitated and/or condensed materials by sensing the exceeding of a threshold value of the pressure differential of the waste gas at a point before the cooling and at a point after the cooling.

* * * * *